T. BROWN.
MECHANISM FOR TRANSMITTING ROTARY MOTION.
APPLICATION FILED DEC. 24, 1909.

947,588.

Patented Jan. 25, 1910.
2 SHEETS—SHEET 1.

Witnesses
R. D. Tolman.
Penelope Comberbach.

Inventor
Theophilus Brown.
By Rufus B. Fowler
Attorney

T. BROWN.
MECHANISM FOR TRANSMITTING ROTARY MOTION.
APPLICATION FILED DEC. 24, 1908.
947,588.
Patented Jan. 25, 1910.
2 SHEETS—SHEET 2.
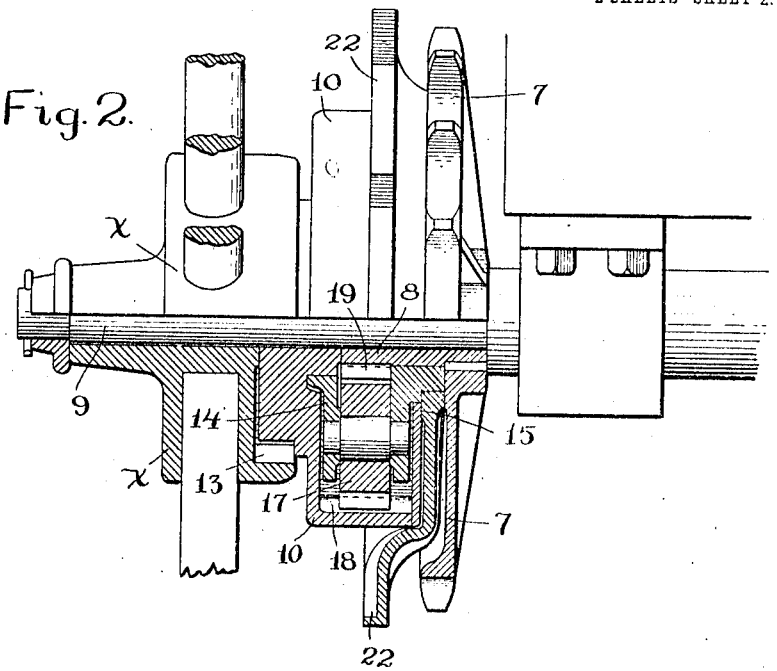
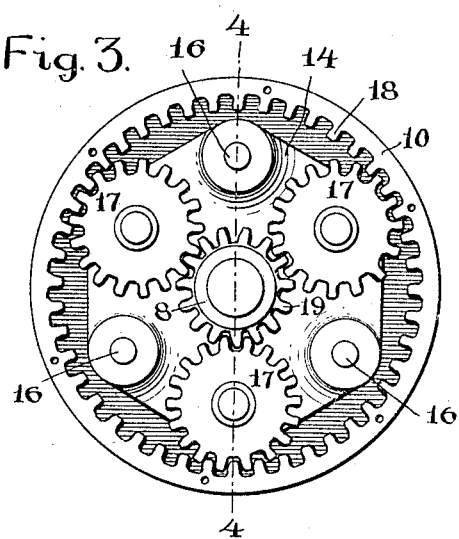
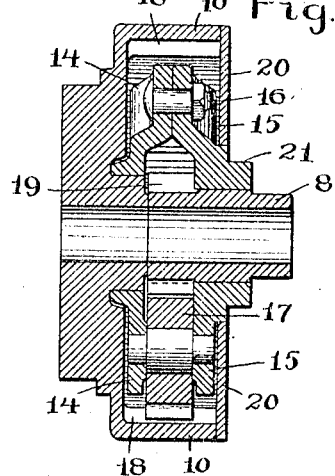
Witnesses
R. D. Tolman.
Penelope Cumberbach.
Inventor
Theophilus Brown
By Rufus B. Fowler
Attorney

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MECHANISM FOR TRANSMITTING ROTARY MOTION 947,588.  Specification of Letters Patent.  Patented Jan. 25, 1910.

Application filed December 24, 1906. Serial No. 349,326.

*To all whom it may concern:*

Be it known that I, THEOPHILUS BROWN, a citizen of the United States, residing at Worcester, in the county of Worcester and Commonwealth of Massachusetts, have invented a new and useful Improvement in Mechanism for Transmitting Rotary Motion, of which the following is a specification, accompanied by drawings forming a part of the same, in which—

Figure 1:
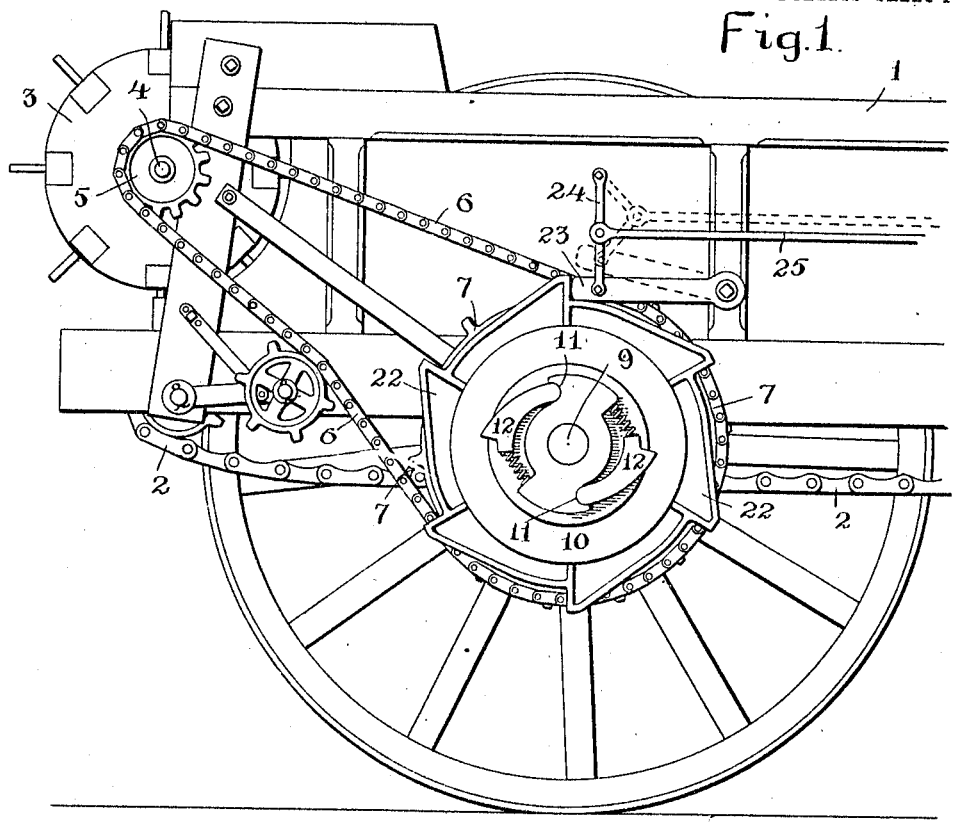
Figure 5:
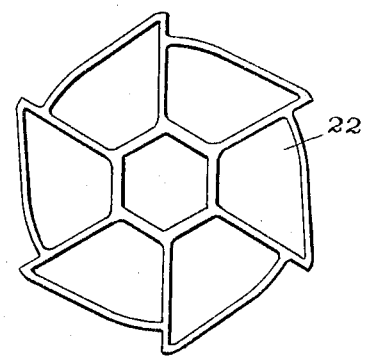

Figure 1 is a side view of the rear portion of a manure spreader embodying my invention, with one rear wheel removed. Fig. 2 is a view partly in section on an enlarged scale, of the gear connection between the rear wheel and the sprocket wheel. Fig. 3 is a view on an enlarged scale, of the toothed revolving shell showing the arrangement of planetary gearing to drive the sprocket wheel. Fig. 4 is a sectional view taken on line 4—4, Fig. 3, and Fig. 5 is a side view, on the same scale as Fig. 1, of the toothed stop wheel by means of which the revolving shell is held, and the driving power brought into operative engagement with the sprocket wheel.

Similar reference letters and figures refer to similar parts in the different views.

My invention relates to improved mechanism for transmitting rotary motion, shown as applied to a manure spreader, and arranged to rotate the beater from one of the rear supporting wheels, and it includes means mounted on the rear axle for the transmission of power from said rear supporting wheel to a sprocket wheel connected with the beater shaft, and so arranged that the sprocket wheel may be disconnected at will from the rear wheel; and it consists in the construction and arrangement of parts as hereinafter described and pointed out in the annexed claims.

Referring to the accompanying drawings 1 denotes the body of the manure spreader provided with an endless bottom 2 and a beater 3. The shaft 4 of the beater is provided with a sprocket wheel 5 which is connected by a chain 6 with a sprocket wheel 7 attached to a sleeve 8 mounted on the rear axle 9, in the well known manner. Turning on the axle 9 is a shell 10 having a hub provided with recesses 11, 11, in which are mounted pawls 12, 12, arranged to engage internal ratchet teeth 13 on the hub $x$ of one of the rear supporting wheels of the manure spreader, whereby the shell 10 is rotated by the hub $x$ when the manure spreader is moved forward, but stands still when the spreader is moved backward.

The pawl and ratchet connection between the hub $x$ of the rear wheel and the driving mechanism of the beater is in common use and forms no part of my present invention. Inside the shell 10 are two plates 14, 15, fastened together at their points of contact by bolts 16, forming a framework for intermediate pinions 17, which are mounted between the plates 14, 15, and are arranged to engage an internal gear 18 on the shell 10. The intermediate pinions 17 also engage a pinion 19 mounted on the sleeve 8 on the axle 9, forming the driving arrangement known as planetary gearing. The shell 10 is closed to dust by an annular cover 20. The plate 15 is provided with an angular, in this instance hexagonal, hub 21 on which is mounted a toothed stop wheel 22, a dog 23 operated by the lever 24 and link 25 connected with a hand lever, not shown, at the wagon seat, is used to engage the teeth 26 of the stop wheel 22, thereby holding the stop wheel 22 and the plates 14, 15, from rotation. The sprocket wheel 7 is mounted on the sleeve 8 and therefore will be rotated by the revolution of the gear 19, thereby rotating the beater through the chain 6 and sprocket wheel 5.

In operation the shell 10 is rotated from the forward movement of the rear hub $x$ by the pawls 12, 12, and, if the plates 14, 15, are not held from rotation the shell 10 carries the intermediate pinions 17 around the pinion 19 without rotating it. When it is desired to rotate the beater the dog 23 is dropped to engage a tooth of the stop wheel 22, thereby preventing the rotation of the plates 14 and 15. Further revolution of the shell 10 will rotate the pinions 17 and through them the pinion 19 and sprocket wheel 7, thereby accomplishing the rotation of the beater as has been described. I am thus enabled to connect or disconnect at will the sprocket wheel 7 on the rear axle with the hub $x$ of the rear supporting wheel of the manure spreader, thereby controlling the rotation of the beater. This permits a compact arrangement of gearing about the rear axle which can be completely cased up to protect from dirt. It also allows a direct drive from the large sprocket wheel rotating concentrically with the main axle to the shaft of the beater without intermediate gearing, and also provides means for disconnecting the beater at will, by releasing the toothed wheel 22, which is accomplished by simply raising the dog 23, thereby obviating the use of a sliding clutch connection on the rear axle. I further cause the beater to rotate in the opposite direction from the rear supporting wheel without the employment of exposed pinions. The shell or case 10, when the annular cover 20 has been applied, completely incloses the planetary gears and by inserting a gasket under the cover or otherwise providing against leakage, the shell may be supplied with oil and the gearing protected from dirt.

I claim,

1. A mechanism for transmitting rotary motion, having a driving member and a driven member, means for connecting said driving and said driven members, comprising a shell connected with one of said members and having an internal gear, a pinion connected with the other of said members, a rotatable frame and external teeth connected therewith, a movable dog arranged to engage said external teeth and thereby hold said frame from rotation, and an intermediate pinion carried by said frame connecting said internal gear and said pinion.

2. In a mechanism for transmitting rotary motion, the combination with a driving member and a driven member, of means for connecting said driving and said driven members, comprising a non-rotatable shaft, a rotatable shell on said shaft connected with one of said members, a rotatable frame on said shaft connected with said shell and connecting means between said frame and the other of said members, arranged to operate upon checking the rotation of said frame.

3. In a mechanism for transmitting rotary motion, the combination with a driving member and a driven member, of means for connecting said driving and said driven members, comprising a pinion connected with said driven member, a rotatable shell provided with an internal gear and surrounding said pinion, intermediate pinions between said internal gear and said pinion, a rotatable frame supporting said intermediate pinions, a toothed wheel attached to said frame, a movable dog for engaging said toothed wheel, and means for connecting said shell with said driving member.

4. In a mechanism for transmitting rotary motion, the combination with a driving member and a driven member, of means for connecting said driving and said driven members, comprising a non-rotating shaft, a rotatable shell on said shaft connected with one of said members, a pinion on said shaft connected with the other of said members, said shell having an internal gear and surrounding said pinion, intermediate pinions between said internal gear and said pinion, a frame supporting said intermediate pinions rotatable around said shaft, a toothed wheel attached to said frame and a movable dog for engaging said toothed wheel.

Dated this 19th day of December 1906.

THEOPHILUS BROWN.

Witnesses:
PENELOPE COMBERBACH,
RUFUS B. FOWLER.